United States Patent
Lang-Wittkowski et al.

(10) Patent No.: US 7,575,804 B2
(45) Date of Patent: Aug. 18, 2009

(54) COARSE-PARTICLE MICROCAPSULE PREPARATION

(75) Inventors: Gabriele Lang-Wittkowski, Mannheim (DE); Ekkehard Jahns, Weinheim (DE); Markus Steffen, Maikammer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 27 days.

(21) Appl. No.: 11/813,677

(22) PCT Filed: Jan. 14, 2006

(86) PCT No.: PCT/EP2006/000291

§ 371 (c)(1), (2), (4) Date: Jul. 11, 2007

(87) PCT Pub. No.: WO2006/077056

PCT Pub. Date: Jul. 27, 2006

(65) Prior Publication Data

US 2008/0166555 A1 Jul. 10, 2008

(30) Foreign Application Priority Data

Jan. 18, 2005 (DE) .................. 10 2005 002 411

(51) Int. Cl.
*B32B 5/66* (2006.01)
(52) U.S. Cl. .............. 428/403; 428/404; 428/405; 428/406; 428/407; 427/212; 427/213.3; 427/213.31; 427/213.36
(58) Field of Classification Search ......... 428/403–407; 427/212, 213.3, 213.31–213.36
See application file for complete search history.

(56) References Cited

U.S. PATENT DOCUMENTS

| | | | |
|---|---|---|---|
| 4,807,696 A | 2/1989 | Colvin et al. | |
| 6,200,681 B1 * | 3/2001 | Jahns et al. | 428/402.24 |
| 6,379,769 B1 * | 4/2002 | Kleinke et al. | 428/68 |
| 7,166,355 B2 * | 1/2007 | Jahns et al. | 428/402.21 |
| 2002/0061954 A1 | 5/2002 | Davis et al. | |
| 2004/0079515 A1 | 4/2004 | Fieback et al. | |
| 2004/0084658 A1 | 5/2004 | Ottinger et al. | |
| 2007/0248824 A1 | 10/2007 | Lang-Wittkowski et al. | |

FOREIGN PATENT DOCUMENTS

| | | |
|---|---|---|
| DE | 100 48 536 A1 | 5/2001 |
| DE | 199 54 722 A1 | 5/2001 |
| DE | 101 02 250 A1 | 1/2002 |
| DE | 100 58 101 A1 | 6/2002 |
| DE | 102 00 316 A1 | 7/2002 |
| DE | 101 39 171 A1 | 2/2003 |
| EP | 0 306 202 A2 | 3/1989 |
| EP | 1 029 018 B1 | 9/2001 |
| EP | 1 197 722 A2 | 4/2002 |
| EP | 1 416 027 A1 | 5/2004 |
| JP | 2001-303032 | 10/2001 |
| JP | 2005-61078 | 3/2005 |
| WO | WO 03/016650 A1 | 2/2003 |
| WO | WO 2006/018130 A1 | 2/2006 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

The present invention relates to a coarse-particled microcapsule preparation comprising microencapsulated latent heat accumulators and one or more polymeric binders, the ratio of surface area to volume of the particles obeying the following relationship:

$$\frac{\sqrt[2]{\text{Surface area}}}{\sqrt[3]{\text{Volume}}} \geq 2.5,$$

and to processes for its production and its use in heat exchangers and building materials.

20 Claims, 4 Drawing Sheets

COARSE-PARTICLE MICROCAPSULE PREPARATION

The present invention relates to a coarse-particled microcapsule preparation comprising microencapsulated latent heat accumulators and one or more polymeric binders, the ratio of surface area to volume of the particles obeying the following relationship:

$$\frac{\sqrt[2]{\text{Surface area}}}{\sqrt[3]{\text{Volume}}} \geq 2.5,$$

and to processes for its production and its use in heat exchangers and building materials.

In recent years, building materials comprising latent heat accumulators have been investigated as a novel material combination. Their mode of operation is based on the enthalpy of transformation which occurs at the solid/liquid phase transition and signifies energy uptake or energy release to the environment. They can therefore be used for keeping the temperature constant in a specified temperature range. Since the latent heat accumulator materials may also be present in liquid form depending on the temperature, they cannot be processed directly with building materials since emissions to the room air and the separation of the building material would be likely.

EP-A-1 029 018 teaches the use of microcapsules having a capsule wall comprising a highly crosslinked methacrylic ester polymer and a latent heat accumulator core in binding building materials such as concrete or gypsum. Since the capsule walls only have a thickness in the range from 5 to 500 nm, however they are very pressure-sensitive, an effect which is utilized in their use in copying papers. However, this limits their usability.

DE-A-101 39 171 describes the use of microencapsulated latent heat accumulator materials in sandwich-type plasterboards. Furthermore the prior U.S. Application Ser. No. 60/573420 teaches the use of microencapsulated heat accumulator materials in particle boards together with melamine/formaldehyde resins as binder.

In all these various applications the microcapsules are used in the form of powder having particles sizes in the range from 1 to 50 μm. However, powders are often difficult to process. Formulations having a high binder content are the result. If the ratio of microcapsules to binder, calculated as solid based on their sum, is considered in the publications described above, the proportion of microcapsules ranges up to not more than 30% by weight and the proportion of binder is 70% by weight or more. Optimization by increasing the proportion of latent heat accumulator, which in fact corresponds to the proportion of microcapsules, was therefore desirable.

DE-A-102 00 316 teaches the production of plastics injection molded parts from plastics granules to which carrier material parts comprising latent heat accumulators are added prior to injection into the mold cavity. The capillary spaces of the mineral carrier materials have an absorptive solid structure in which the latent heat accumulator materials are held. However, capillary spaces in the carrier material are in the end open systems, so that the emergence of liquid wax is to be expected whenever the latent heat accumulators change into the liquid phase in the case of temperature in creases.

JP 2001098259 describes the mixing of microencapsulated latent heat accumulator material with water and cement and comminution of the hardened material to particle sizes of >1 mm. Such particles are used as fillings in walls and floors.

JP 2001303032 teaches a microcapsule extrudate comprising a silica gel pigment and a microcapsule dispersion whose microcapsules have a capsule core comprising latent heat accumulator material.

U.S. Pat. No. 6,703,127 teaches macroparticles which are formed by suspending microencapsulated latent heat accumulator material in a solution of a thickener and hardening the drops by dropwise addition to a solution of a crosslinking agent. Drops hardened in this manner have substantially poorer performance characteristics.

GB 870 476 describes macrocapsules comprising microcapsules having a film-forming wall material, such as gelatine, which are held together in clusters by a capsule wall comprising such a film-forming polymer. Such macrocapsules have much poorer performance characteristics since they tend to swell and are sensitive to bacteria.

EP-A-1416027 states that latent heat accumulator material is mixed with expanded graphite and is extruded, and the particles obtained can be used as a bed. Here too, separation and continuous emissions to the room air are to be feared since the latent heat accumulator material used is not encapsulated.

DE-A-100 58 101 describes latent heat accumulator bodies having an external shell body comprising rigid plastic such as polymethyl methacrylate, and a filing comprising latent heat accumulator material. These bodies are produced by means of a two-component injection molding method. The latent heat accumulator material is solidified to a gel-like state by addition of block copolymers. In this way, large heat accumulator panels can be produced by final roping of the body. Here, as also in DE-A-102 00 316, the latent heat accumulator materials are processed directly and stabilization is achieved by means of wax additives.

Finally, DE-A-100 48 536 teaches a dynamic latent heat accumulator comprising a latent heat accumulator material thickened to a gel-like state, between whose small particles a heat transfer medium flows. The principle of operation is based on the fact that the heat transfer liquid evaporates and condenses on contact with the latent heat accumulator and releases the energy to it. However, the fact that the particles become soft as a result of heat supply and the flow paths become constricted is problematic.

The use of latent heat accumulator materials solidified to a gel-like state and of an additional supporting structure results moreover in the proportion of latent heat accumulator material being less than 50% by weight, based on the total weight of the preparation.

WO 200224789 is concerned with polymer blends comprising polyethylene which are obtained by mixing of molten polyethylene with microencapsulated latent heat accumulators and subsequent comminution and are extruded together with polypropylene in a second processing step. However, pellets obtained in this manner have a very small proportion of latent heat accumulator so that the heat storage capacity is only small.

The prior application PCT/EP 2005/008354 teaches coarse-particled microcapsule formulations having microcapsule wails comprising polymethyl methacrylate and a binder polymer which has film-forming properties.

It was therefore an aspect of the present invention to provide a latent heat accumulator preparation whose proportion of latent heat accumulator material is high and which thus has a high storage energy and an even better efficiency.

Furthermore, the latent heat accumulator preparation should be capable of being used advantageously in heat exchangers and in open systems, such as for central and localized ventilation.

Accordingly, the abovementioned coarse-particled microcapsule preparation comprising one or more microencapsulated latent heat accumulator materials and one or more polymeric binders was found.

In the context of the present invention, coarse-particled is to be understood as meaning particles whose dimensions are in the range from 200 μm to 5 cm, preferably from 500 μm to 2 cm. These particles may have amorphous, spherical to acicular shape, depending on the respective method of production. In cases of spherical structures, the mean diameter is from 200 μm to 2 cm, preferably from 500 μm to 1 cm. Acicular shapes have a value of not more than 5 cm, as a rule in the range from 1 mm to 2 cm, in their longest dimension. The shortest dimension has a value of at least 200 μm, as a rule from 500 μm to 10 mm, preferably from 500 μm to 5 mm. In the case of the acicular particles, the ratio of length to diameter usually will not exceed the value of 10:1, preferably the value 5:1.

In the preferred microcapsule preparations according to the invention, 90% by weigh, of the particles are >500 μm, preferably >700 μm, in particular >1 mm, determined by a screening technique.

In an embodiment, the particles according to the invention are asymmetrical aggregates of powder particles which only approximately have the shape of a sphere, of a rod or of a cylinder and whose su ace is often uneven and jagged. Such particles are often also referred to as granules or agglomerate. Another form of the agglomerates comprises pellets or tablets, as are known from the preparation of drugs.

The particles according to the invention may have any desired geometrical shapes. Basic geometrical elements may be, for example, spheres, cylinders, cubes, cuboids, prism, pyramids, cones, truncated cones and truncated pyramids. Star extrudates, cross extrudates, ribbed extrudates and trilobes are furthermore suitable. The geometrical elements may be either hollow or solid. Cavities, such as incorporated tubes, increase the surface area of the geometrical element with simultaneous reduction of its volume. The figures attached to this document show some geometrical elements which are suitable in principle. FIGS. 7 to 10 show, in addition to the element (A), in each case a view of the element from above (B). According to the invention, the ratio of surface area to volume of articles obeys the following relationship:

$$\frac{\sqrt[2]{\text{Surface area}}}{\sqrt[3]{\text{Volume}}} \geq 2.5,$$

preferably $\geq 2.6$, particularly preferably $\geq 2.8$ and in particular $\geq 3.0$.

The terms surface area and volume are to be understood as meaning those surface areas and volumes which the eye is capable of perceiving visually on consideration of the geometrical element. In other words, internal volumes and surface areas which are due to finely divided pores and/or cracks in the material of the geometrical element are not included.

The pore area of the particles according to the invention, measured by mercury porosimetry according to DIN 66133, is preferably 2-100 m$^2$/g, in particular 30-100 m$^2$/g.

According to an embodiment, the coarse-particled preparations according to the invention comprise microcapsules and polymeric binders to a predominant extent of at least 90% by weight.

According to another embodiment, the preparations according to the invention comprise at least 80% by weight of microcapsules and polymeric binder. According to this embodiment, the preparation comprises 2-20% by weight of graphite, based on the total weight of the coarse-particled preparation.

Preferably, the binder content, calculated as solid, is 1-40% by weight, preferably 1-30% by weight, particularly preferably 1-25% by weight, in particular 1-20% by weight and very particularly preferably 2-15% by weight, based on the total weight of the coarse-particled preparation.

Preferred preparations comprise 55-94% by weigh of latent heat accumulator material, 1-40% by weight, preferably 1-30% by weight, of polymeric binder, calculated as solid, microcapsule wall material and 0-10% by weight of other additives, based on their total weight.

Preparations, in particular granules comprising 85-99% by weight of microencapsulated latent heat accumulators, 1-15% by weight of polymeric binder, calculated as solid, and 0-5% by weight of other additives are particularly preferred.

Since the coarse-particled microcapsule preparations are generally prepared by processing with water or aqueous substances, the preparations ray still comprise residues of water. The amount of residual moisture is usually from 0 to about 2% by weight, based or the total weight.

The microcapsules which the preparation comprises are particles having a capsule core predominantly comprising, in an amount of more than 95% by weight, latent accumulator materials and a polymer as a capsule wall. The capsule core is solid or liquid, depending on the temperature. The mean particle size of the capsules (Z average by means of light scattering) is from 0.5 to 100 μm, preferably from 1 to 80 μm, in particular from 1 to 50 μm. The weight ratio of capsule core to capsule wall is in general from 50:50 to 95:5. A core/wall ratio of from 70:30 to 93:7 is preferred.

Latent heat accumulator materials are by definition substances which have a phase transition in the temperature range in which heat transfer is to be carried out. The latent heat accumulator materials preferably have a solid/liquid phase transition in the temperature range from −20 to 120° C. As a rule, the latent heat accumulator material is an organic preferably lipophilic substance.

The following may be mentioned by way of example as suitable substances:

aliphatic hydrocarbon compounds, such as saturated or unsaturated $C_{10}$-$C_{40}$-hydrocarbons, which are branched or preferably linear, for example such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane or n-octacosane, and cyclic hydrocarbons, e.g. cyclohexane, cyclooctane or cyclodecane;

aromatic hydrocarbon compounds, such as benzene, naphthalene, biphenyl, o- or n-terphenyl, $C_1$-$C_{40}$-alkyl-substituted aromatic hydrocarbon such as dodecylbenzene, tetradecylbenzene, hexadecylbenzene, hexylnaphthalene or decylnaphthalene;

saturated or unsaturated $C_6$-$C_{30}$-fatty acids, such as lauric, stearic, oleic or behenic acid, preferably eutectic mixtures of decanoic acid with, for example, myristic, palmitic or lauric acid;

fatty alcohols, such as lauryl, stearyl, oleyl, myristyl or cetyl alcohol, mixtures such as coconut fatty alcohol and so-called oxo alcohols which are obtained by hydroformylation of α-olefins and further reactions;

$C_6$-$C_{30}$-fatty amines, such as decylamine, dodecylamine, tetradecylamine or hexadecylamine;

esters, such as $C_1$-$C_{10}$-alkyl esters of fatty acids, such as propyl palmitate, methyl stearate or methyl palmitate, and preferably their eutectic mixtures or methyl cinnamate, natural and synthetic waxes, such as montanic acid waxes, montanic ester waxes, carnauba wax, polyethylene wax, oxidized waxes, polyvinyl ether wax, ethylene/vinyl acetate wax or hard waxes obtained by the Fischer-Tropsch process;

halogenated hydrocarbons, such as chloroparaffin, bromooctadecane, bromopentadecane, bromononadecane, bromoeicosane or bromodocosane.

Furthermore, mixtures of these substances are suitable so long as there is no melting point depression outside the desired range, or the heat of fusion of the mixture is too low for an expedient application.

For example, the use of pure n-alkanes, n-alkanes having a purity greater than 80% of alkane mixtures such as those obtained as an industrial distillate and commercially available as such, is advantageous.

Furthermore, it may be advantageous to add to the capsule core-forming substances compounds which are soluble in them, in order to prevent the freezing point depression which occurs in the case of some of the nonpolar substances. As described in U.S. Pat. No. 5,456,852, compounds having a melting point which is from 20 to 120 K higher than the actual core substance are advantageously used. Suitable compounds are the fatty acids, fatty alcohols, fatty amides and aliphatic hydrocarbon compounds mentioned above as lipophilic substances. They are added in amounts of from 0.1 to 10% by weight, based on the capsule core.

Latent heat accumulator materials are chosen according to the temperature range in which the heat accumulators are desired. For example, latent heat accumulator materials whose solid/liquid phase transition is in the temperature range from 0 to 60° C. are preferably used for heat accumulators in building materials in a temperate climate. Thus, as a rule, individual substances or mixtures having transformation temperatures of from 15 to 30° C. are chosen for interior applications. In the case of solar applications as a storage medium or for avoiding overheating of transparent heat insulation, as described in EP-A-333 145, transformation temperatures of 30-60° C. are especially suitable.

Preferred latent heat accumulator materials are aliphatic hydrocarbons, particularly preferably those listed by way of example above. In particular, aliphatic hydrocarbons having 14 to 20 carbon atoms and mixtures thereof are preferred.

In principle, the materials known for the microcapsules for copying papers can be used as polymer for the capsule wall. Thus, for example, it is possible to encapsulate the latent heat accumulator materials in gelatin with other polymers by the processes described in GB-A 870476, U.S. Pat. No. 2,800,457 or U.S. Pat. No. 3,041,289.

Preferred wall materials for the capsule wall of the microcapsules are thermosetting polymers, since they are very stable to aging. Thermosetting is to be understood as meaning wall materials which, owing to the high degree of crosslinking, do not soften but decompose at high temperatures. Suitable thermosetting wall materials are, for example, highly crosslinked formaldehyde resins, highly crosslinked polyureas and highly crosslinked polyurethanes and highly crosslinked acrylic and methacrylic ester polymers.

Formaldehyde resins are understood as meaning reaction products of formaldehyde with triazines, such as melamine carbamides, such as urea phenols, such as phenol, m-cresol and resorcinol amino and amido compounds, such as aniline, p-toluenesulfonamide, ethyleneurea and guanidine, or their mixtures.

Formaldehyde resins preferred as capsule wall material are urea/formaldehyde resins urea/resorcinol/formaldehyde resins, urea/melamine resins and melamine/formaldehyde resins. The $C_1$-$C_4$-alkyl ethers, in particular methyl ethers of these formaldehyde resins and the mixtures with these formaldehyde resins are likewise preferred. Melamine/formaldehyde resins and/or methyl ethers thereof are particularly preferred.

In the processes known from the copying papers, the resins are used as prepolymers. The prepolymer is still soluble in the aqueous phase and migrates in the course of the polycondensation to the interface and encloses the oil droplets. Processes for microencapsulation using formaldehyde resins are generally known and are described, for example, in EP-A-562 344 and EP-A-974 394.

Capsule walls comprising polyureas and polyurethanes are likewise known form the copying papers. The capsule walls form by reaction of reactants carrying $NH_2$ groups or OH groups with di- and/or polyisocyanates. Suitable isocyanates are, for example, ethylene diisocyanate, tetramethylene 1,4-diisocyanate, hexamethylene 1,6-diisocyanate and toluene 2,4- and 2,6-diisocyanate. Polyisocyanates, such as derivatives having a biuret structure, polyuretonimines and isocyanurates may furthermore be mentioned. Suitable reactants are: hydrazine, guanidine and salts thereof hydroxylamine di- and polyamines and amino alcohols. Such interfacial polyaddition processes are disclosed for example, in U.S. Pat. No. 4,021,595, EP-A 0 392 876 and EP-A 0 535 384.

Microcapsules whose capsule wall is a highly crosslinked methacrylic ester polymer are preferred. The degree of crosslinking is achieved using a proportion of crosslinking agent of $\geq 10\%$ by weight based on the total polymer.

In the preferred microcapsules, the wall-forming polymers are composed of from 10 to 100% by weight preferably from 30 to 95% by weight of one or more $C_1$-$C_{24}$-alkyl esters of acrylic and/or methacrylic acid as monomers I. In addition the polymers may comprise) incorporated in the form of polymerized units up to 80% by weight preferably from 5 to 60% by weight, in particular from 10 to 50% by weight, of a bifunctional or polyfunctional monomer as monomers II, which is insoluble or sparingly soluble in water. The polymers may additionally comprise incorporated in the form of polymerized units up to 90% by weight, preferably up to 50% by weight in particular up to 30% by weight, of other monomers III.

Suitable monomers I are $C_1$-$C_{24}$-alkyl esters of acrylic and/or methacrylic acid. Particularly preferred monomers I are methyl, ethyl, n-propyl and n-butyl acrylate and/or the corresponding methacrylates. Isopropyl, isobutyl, sec-butyl and ter-butyl acrylate and the corresponding methacrylates are preferred. Furthermore, methacrylonitrile may be mentioned. In general, the methacrylates are preferred.

Suitable monomers II are bifunctional or polyfunctional monomers which are insoluble or sparingly soluble in water but have good to limited solubility in the lipophilic substance. Sparing solubility is to be understood as meaning a solubility of less than 60 g/l at 20° C. Bifunctional or polyfunctional monomers are understood as meaning compounds which have at least two nonconjugated ethylenic double bonds. Divinyl and polyvinyl monomers which result in crosslinking of the capsule wall during polymerization are chiefly suitable.

Preferred bifunctional monomers are the diesters of diols with acrylic acid or methacrylic acid, and furthermore the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Propanediol diacrylate, butanediol diacrylate, pentanediol diacrylate and hexanediol diacrylate or the corresponding methacrylates are particularly preferred.

Preferred polyvinyl monomers are trimethylolpropane triacrylate and trimethacrylate, pentaerythrityl triallyl ether and pentaerythrityl tetraacrylate.

Suitable monomers III are other monomers, preferably monomers IIIa, such as vinyl acetate, vinyl propionate and vinylpyridine.

The water-soluble monomers IIIb are particularly preferred, e.g. acrylonitrile, methacrylamide, acrylic acid, methacrylic acid, itaconic acid, maleic acid, maleic anhydride, N-vinylpyrrolidone, 2-hydroxyethyl acrylate and methacrylate and acrylamido-2-methylpropanesulfonic acid. In addition, N-methylolacrylamide, N-methylolmethacrylamide, dimethylaminoethyl methacrylate and diethylaminoethyl methacrylate may be mentioned in particular.

According to a further referred embodiment, the wall-forming polymers are formed from 30 to 90% by weight of methacrylic acid, 10 to 70% by weight of an alkyl ester of (meth)acrylic acid, preferably methyl methacrylate, tert-butyl methacrylate, phenyl methacrylate and cyclohexyl methacrylate, and from 0 to 40% by weight of further ethylenically unsaturated monomers. These further ethylenically unsaturated monomers may be the monomers I, II or III not mentioned so far for this embodiment. Since they generally have no substantial influence on the microcapsules of this embodiment which are formed, their proportion is preferably <20% by weight, in particular <10% by weight. Such microcapsules and their production are described in EP-A-1 251 954, which is hereby incorporated by reference.

The microcapsules suitable for the use according to the invention can be produced by so-called in situ polymerization.

The preferred microcapsules and their production are disclosed in EP-A-457 154, DE-A-10 139 171, DE-A-102 30 581 and EP-A-1 321 182, which are hereby incorporated by reference. Thus, microcapsules are produced by preparing a stable oil-in-water emulsion from the monomers, a free radical initiator, a protective colloidal and a lipophilic substance to be encapsulated, in which emulsion said microcapsules are present as the disperse phase. The polymerization of the monomers is then initiated by heating and is controlled by further temperature increase, the resulting polymers forming the capsule wall which encloses the lipophilic substance.

As a rule, the polymerization is carried out at from 20 to 100° C., preferably at from 40 to 80° C. Of course, the dispersion and polymerization temperature should be above the melting point of the lipophilic substances.

After the final temperature has been reached, the polymerization is expediently continued for about a time of up to 2 hours in order to decrease residual monomer contents. After the actual polymerization reaction, at a conversion of from 90 to 99% by weight, it is generally advantageous to ensure that the aqueous microcapsule dispersions are substantially free of odoriferous substances, such as residual monomers and other organic volatile components. This can be achieved physically in a manner known per se by distillative removal (in particular by means of steam distillation) or by stripping with an inert gas. Furthermore, it can take place chemically, as described in WO 9924525, advantageously by redox initiated polymerization, as described in DE-A-4 435 423, DE-A-4419518 and DE-A-4435422.

Microcapsules having a mean particle size in the range from 0.5 to 100 μm can be prepared in this manner, it being possible to adjust the particle size in a manner known per se by means of the shear force, the stirring speed, the protective colloid and its concentration.

Preferred protective colloids are water-soluble polymers since these reduce the surface tension of water from a maximum of 73 mN/m to 45 to 70 mN/m and thus ensure the formation of cohesive capsule walls and form microcapsules having, preferably, particle sizes of from 1 to 30 μm, preferably from 3 to 12 μm.

As a rule, the microcapsules are produced in the presence of at least one organic protective colloid which may be either anionic or neutral. Anionic and nonionic protective colloids may also be used together. Inorganic protective colloids, if appropriate as a mixture with organic protective colloids or nonionic protective colloids, are preferably used.

Organic neutral protective colloids are cellulose derivatives, such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, sodium alginate, casein, polyethylene glycols, preferably polyvinyl alcohol and partially hydrolyzed polyvinyl acetates and methylhydroxypropylcellulose.

Suitable anionic protective colloids are polymethacrylic acid, the copolymers of sulfoethyl acrylate and methacrylate, sulfopropyl acrylate and methacrylate, of N-(sulfoethyl)maleimide, of 2-acrylamido-2-alkanesulfonic acids, of styrenesulfonic acid and of vinylsulfonic acid.

Preferred anionic protective colloids are naphthalenesulfonic acid and naphthalenesulfonic acid/formaldehyde condensates and especially polyacrylic acids and phenolsulfonic acid/formaldehyde condensates.

The anionic and nonionic protective colloids are used as a rule in amounts of from 0.1 to 10% by weight, based on the aqueous phase of the emulsion.

Inorganic protective colloids, so-called Pickering systems, which permit stabilization by very fine solid particles and are insoluble but dispersible in water or are insoluble and non-dispersible in water but wettable by the lipophilic substance are preferred.

The mode of action and their use are described in EP-A-1 029 018 and EP-A-1 321 182, the contents of which are hereby incorporated by reference.

A Pickering system may consist of the solid particles alone or additionally of assistant which improve the dispersibility of the particles in water or the wettability of the particles by the lipophilic phase.

The inorganic solid particles may be metal salts, such as salts, oxides and hydroxides of calcium, magnesium, iron, zinc, nickel titanium, aluminum, silicon, barium and manganese. Magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide may be mentioned. Silicates, bentonite, hydroxyapatite and hydrotalcites may likewise be mentioned. Finely divided silicas, magnesium pyrophosphate and tricalcium phosphate are particularly preferred.

The Pickering systems can be added both initially to the aqueous phase and to the stirred oil-in-water emulsion. Some fine, solid particles are produced by precipitation, as described in EP-A-1 029 018 and FP-A-1 321 182.

The finely divided silicas may be dispersed as fine, solid particles in water. However, it is also possible to use so-called colloidal dispersions of silica in water. The colloidal dispersions are alkaline, aqueous mixtures of silica. In the alkaline pH range, the particles are swollen and are stable in water. For use of these dispersions as a Pickering system, it is advantageous if the pH of the oil-in-water emulsion is adjusted with an acid to pH 2 to 7.

The inorganic protective colloids are to be used as a rule in amounts of from 0.5 to 15% by weight, based on the aqueous phase.

In general the organic neutral protective colloids are used in amounts of from 0.1 to 15% by weight, preferably from 0.5 to 10% by weight, based on the aqueous phase.

The dispersing conditions for the preparation of the stable oil-in-water emulsion is preferably chosen in a manner known per se so that the oil droplets have the size of the desired microcapsules.

The microcapsule dispersions obtained by the polymerization give a readily free-flowing capsule powder on spray drying. The spray drying of the microcapsule dispersion can be effected in a conventional manner. In general, a procedure is adopted in which the entry temperature of the warm air stream is in the range from 100 to 200° C., preferably from 120 to 160° C., and the exit temperature of the warm air stream is in the range from 30 to 90° C., preferably from 60 to 80° C. The spraying of the aqueous polymer dispersion in the warm air stream can be effected, for example, by means of airless or multimaterial nozzles or via a rotating disk. The deposition of the polymer powder is usually effected with the use of cyclones or filter separators. The sprayed aqueous polymer dispersion and the warm air stream are preferably fed in parallel.

If appropriate, spraying assistants are added for spray drying, in order to facilitate the spray drying or to establish certain powder properties, e.g. low dust content, flowability or improved redispersibility. The person skilled in the art is familiar with a multiplicity of spray assistants. Examples of these are to be found in DE-A 19629525, DE-A 19629526, DE-A 2214410, DE-A 2445813, EP-A 407889 or EP-A 784449. Advantageous spray assistants are, for example, water-soluble polymers of the type comprising polyvinyl alcohol or partly hydrolyzed polyvinyl acetates cellulose derivatives, such as hydroxyethylcellulose, carboxymethylcellulose, methylcellulose, methylhydroxyethylcellulose and methylhydroxypropylcellulose, polyvinylpyrrolidone, copolymers of vinylpyrrolidone, gelatin, preferably polyvinyl alcohol and partly hydrolyzed polyvinyl acetates and methylhydroxypropylcellulose.

Polymeric binders are generally known. These are fluid systems which comprise, as the disperse phase in an aqueous dispersing medium, polymer coils which consist of a plurality of entangled polymer chains, the so-called polymer matrix or polymer particles, in a disperse distribution. The weight average diameter of the polymer particles is frequently in the range from 10 to 1000 nm, often from 50 to 500 nm or from 100 to 400 nm. In addition to the polymer (binder polymer), the polymeric binder comprises the assistants described below. The binder polymers according to the invention preferably have thermoplastic properties. Thermoplastic is to be understood as meaning that the binder polymers soften without decomposition above the glass transition temperature.

According to the invention, in principle all finely divided polymers which are capable of forming a polymer film at the processing temperature, i.e. are film-forming at these temperatures, can be used as polymeric binders (binder polymers). According to a preferred variant, the polymers are not water-soluble. This permits the use of the coarse-particled preparations according to the invention in moist or aqueous systems.

According to the invention, it is possible to use those polymers whose glass transition temperature is from −60° C. to +150° C., often from −20 to +130° C. and frequently from 0 to +120° C. The glass transition temperature ($T_g$) means the limiting value of the glass transition temperature to which this tends with increasing molecular weigh according to G. Kanig (Kolloid-Zeitschrift & Zeitschrift für Polymers, Vol. 190, page 1, equation 1). The glass transition temperature is determined by the DSC method (differential scanning calorimetry, 20 K/min, midpoint measurement, DIN 53 765).

Polymers having a glass transition temperature in the range from 40 to 120° C. are very particularly preferred. As a rule, they are processed at temperatures in the range from 20 to 120° C. Coarse-particled compositions obtained in this manner exhibit particularly good mechanical stability and have good abrasion values.

The glass transition temperature of polymers which are composed of ethylenically unsaturated monomers can be controlled in a known manner by means of the monomer composition (T. G. Fox, Bull. Am. Phys. Soc. (Ser. II) 1, 123 [1956] and Ullmanns Enzyklopedia of Industrial Chemistry 5th Edition, Vol. A21, Weinheim (1989) page 169).

Preferred polymers are composed of ethylenically unsaturated monomers M which, as a rule, comprise at least 80% by weight, in particular at least 90% by weight, of ethylenically unsaturated monomers A which are chosen from monomers having a water solubility of <10 g/l (25° C. and 1 bar) and mixtures thereof with acrylonitrile and/or methacrylonitrile, the proportion of acrylonitrile and methacrylonitrile not as a rule exceeding 30% by weight and being, for example, from 1 to 30% by weight or from 5 to 25% by weight of the monomers A. In addition, the polymers also comprise from 0.5 to 20% by weight of monomers B differing from the monomers A. Here and below, all quantity data for the monomers in % by weight are based on 100% by weight of monomers M.

Monomers A are as a rule monoethylenically unsaturated or conjugated diolefins. Examples of monomers A are:

esters of an α,β-ethylenically unsaturated $C_3$-$C_6$-monocarboxylic acid or $C_4$-$C_8$-dicarboxylic acid with a $C_1$-$C_{10}$-alkanol. These are preferably ester of acrylic acid or methacrylic acid, such as methyl (meth)acrylate, ethyl (meth)acrylate, n-butyl (meth)acrylate, tert-butyl (meth)acrylate, 2-ethylhexyl (meth)acrylate, etc.;

vinylaromatic compounds, such as styrene, 4-chlorostyrene, 2-methylstyrene, etc.;

vinyl esters of aliphatic carboxylic acids having preferably 1 to 10 carbon atoms, such as vinyl acetate, vinyl propionate, vinyl laurate, vinyl stearate, vinyl versatate, etc.;

olefins, such as ethylene or propylene;

conjugated diolefins, such as butadiene or isoprene;

vinyl chloride or vinylidene chloride.

Preferred film-forming polymers are selected from the polymer classes I to IV mentioned below:

I) copolymers of styrene with alkyl acrylates, i.e. copolymers which comprise, as monomer A incorporated in the form of polymerized units, styrene and at least one $C_1$-$C_{10}$-alkyl ester of acrylic acid and, if appropriate, one or more $C_1$-$C_{10}$-alkyl esters of methacrylic acid;

II) copolymers of styrene with butadiene, i.e. copolymers which comprise, as a monomer A incorporated in the form of polymerized units, styrene and butadiene and, if appropriate, (meth)acrylates of $C_1$-$C_8$-alkanols, acrylonitrile and/or methacrylonitrile;

III) homo- and copolymers of alkyl (meth)acrylates (pure acrylates), i.e. homo- and copolymers which comprise, as monomers A incorporated in the form of polymerized units, at least one $C_1$-$C_{10}$-alkyl ester of acrylic acid and/or one $C_1$-$C_{10}$-alkyl ester of methacrylic acid, in particular copolymers which comprise, as monomers A incorporated in the form of polymerized units, methyl methacrylate, at least one $C_1$-$C_{10}$alkyl ester of acrylic acid and, if appropriate, one $C_2$-$C_{10}$-alkyl ester of methacrylic acid;

IV) homopolymers of vinyl esters of aliphatic carboxylic acids and copolymers of vinyl esters of aliphatic carboxylic acids with olefins and/or alkyl (meth)acrylates, i.e. homo- and copolymers which comprise, as monomer A incorporated in the form of polymerized units, at least one vinyl ester of an aliphatic carboxylic acid having 2 to 10 carbon atoms and, if appropriate, one or more $C_2$-$C_6$-olefins and/or, if appropriate, one or more $C_1$-$C_{10}$-alkyl esters of acrylic acid and/or of methacrylic acid;

V) copolymers of styrene with acrylonitrile.

Typical $C_1$-$C_{10}$-alkyl esters of acrylic acid in the copolymers of classes I to IV are ethyl acrylate, n-butyl acrylate, tert-butyl acrylate, n-hexyl acrylate and 2-ethylhexyl acrylate.

Typical copolymer of class I comprise, as monomers A, from 20 to 80% by weigh and in particular from 30 to 70% by weight of styrene and from 20 to 80% by weight, in particular from 30 to 70% by weight, of at feast one $C_1$-$C_{10}$-alkyl ester of acrylic acid, such as n-butyl acrylate, ethyl acrylate or 2-ethylhexyl acrylate, based in each case on the total amount of the monomers A.

Typical copolymers of class II comprise, as monomers A, based in each case on the total amount of monomers A, from 30 to 85% by weight, preferably from 40 to 80% by weight and particularly preferably from 50 to 75% by weight of styrene and from 15 to 70% by weight, preferably from 20 to 60% by weight and particularly preferably from 25 to 50% by weight of butadiene, it being possible for from 5 to 20% by weight of the abovementioned monomers A to be replaced by (meth)acrylates of $C_1$-$C_8$-alkanols and/or by acrylonitrile or methacrylonitrile.

Typical copolymers of class III comprise, as monomers A, based in each case on the total amount of the monomers A, from 20 to 80% by weight, preferably from 30 to 70% by weight, of methyl methacrylate and at least one further monomer, preferably one or two further monomers, selected from acrylates of $C_1$-$C_{10}$-alkanols, in particular n-butyl acrylate, 2-ethylhexyl acrylate and ethyl acrylate, and, if appropriate, a methacrylate of a $C_2$-$C_{10}$-alkanol in a total amount of from 20 to 80% by weight and preferably from 30 to 70% by weight, incorporated in the form of polymerized units.

Typical homo- and copolymers of class IV comprise, as monomers A, based in each case on the total amount of monomers A, from 30 to 100% by weight, preferably from 40 to 100% by weight and particularly preferably from 50 to 100% by weight of a vinyl ester of an aliphatic carboxylic acid, in particular vinyl acetate, and from 0 to 70% by weight, preferably from 0 to 60% by weight and particularly preferably from 0 to 50% by weight, of a $C_2$-$C_6$-olefin, in particular ethylene, and, if appropriate, one or to further monomers selected from (meth)acrylates of $C_1$-$C_{10}$-alkanols in an amount of from 1 to 15% by weight, incorporated in the form of polymerized units.

Among the abovementioned polymers, the polymers of classes IV and V are particularly suitable.

Homopolymers of vinyl esters of aliphatic carboxylic acids, in particular of vinyl acetate, are preferred. A special embodiment relates to those which are stabilized with protective colloids, such as polyvinylpyrrolidone and anionic emulsifiers. Such an embodiment is described in WO 02/26845, which is hereby incorporated by reference.

Suitable monomers B are in principle all monomers which differ from the abovementioned monomers and are copolymerizable with the monomers A. Such monomers are known to a person skilled in the art and serve as a rule for modifying the properties of the polymer.

Preferred monomers B are selected from monoethylenically unsaturated mono- and dicarboxylic acids having 3 to 8 carbon atoms, in particular acrylic acid, methacrylic acid, itaconic acid, the amides thereof, such as acrylamide and methacrylamide, the N-alkylolamides thereof, such as N-methylolacrylamide and N-methylolmethacrylamide, the hydroxy-$C_1$-$C_4$-alkyl esters thereof, such as 2-hydroxyethyl acrylate, 2- and 3-hydroxypropyl acrylate, 4-hydroxybutyl acrylate, 2-hydroxyethyl methacrylate, 2- and 3-hydroxypropyl methacrylate and 4-hydroxybutyl methacrylate, and monoethylenically unsaturated monomers having oligoalkylene oxide chains, preferably having polyethylene oxide chains, with degrees of oligomerization preferably in the range from 2 to 200, e.g. monovinyl and monoallyl ethers with oligoethylene glycols, and esters of acrylic acid, of maleic acid and of methacrylic acid with oligoethylene glycols.

The proportion of the monomers having acid groups is preferably not more than 10% by weight and in particular not more than 5% by weight, e.g. from 0.1 to 5% by weight, based on the monomers M. The proportion of hydroxyalkyl esters and monomers having oligoalkylene oxide chains is, where present, preferably in the range from 0.1 to 20% by weight and in particular in the range from 1 to 10% by weight, based on the monomers M. The proportion of the amides and N-alkylolamides is, where present, preferably in the range from 0.1 to 5% by weight.

In addition to the abovementioned monomers B, crosslinking monomers, such as glycidyl ethers and glycidyl esters, e.g. vinyl, allyl and methallyl glycidyl ether, glycidyl acrylate and methacrylate, the diacetonylamides of the abovementioned ethylenically unsaturated carboxylic acids, e.g. diacetone(meth)acrylamide, and the esters of acetylacetic acid with the abovementioned hydroxyalkyl esters of ethylenically unsaturated carboxylic acids, e.g. acetylacetoxyethyl (meth)acrylate, are also suitable as further monomers B. Compounds which have two nonconjugated, ethylenically unsaturated bonds, for example the di- and the oligoesters of polyhydric alcohols with α,β-monoethylenically unsaturated $C_3$-$C_{10}$-monocarboxylic acids, such as alkylene glycol diacrylates and dimethacrylates, e.g. ethylene glycol diacrylate, 1,3-butylene glycol diacrylate, 1,4-butylene glycol diacrylate or propylene glycol diacrylate, and furthermore divinylbenzene, vinyl methacrylate, vinyl acrylate, allyl methacrylate, allyl acrylate, diallyl maleate, diallyl fumarate, methylenebisacrylamide, cyclopentadienyl acrylate, tricyclodecenyl (meth)acrylate, N,N'-dimethylimidazolin-2-one or triallyl cyanurate are furthermore suitable as monomers B. The proportion of crosslinking monomer is as a rule not more than 1% by weight, based on the total amount of monomers and in particular will not exceed 0.1% by weight.

Furthermore, vinylsilanes, e.g. vinyltrialkoxysilanes, are also suitable as monomers B. These are, if desired, used in an amount of from 0.01 to 1% by weight, based on the total amount of monomers, in the preparation of the polymers.

Aqueous polymer dispersions are obtainable in particular by free radical aqueous emulsion polymerization of ethylenically unsaturated monomers. This method has been widely described and is therefore sufficiently well known to the person skilled in the art [cf. for example Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, $2^{nd}$ Edition, Vol. 1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969 and the patent DE-A 40 03 422]. The free radical aqueous emulsion polymerization is usually effected by dispersing the ethylenically unsaturated monomers, frequently with the concomitant use of surface-active substances, in an aqueous medium and effecting polymerization by means of at least one free radical polymerization initiator. Frequently, in the case of aqueous polymer dispersions obtained, the residual contents of unconverted monomers are reduced by chemical and/or physical methods likewise known to the person skilled in the art [cf. for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is brought to a desired value by dilution or concentration or further conventional additives, such as, for example, bactericidal or foam-suppressing additives, are added to the aqueous polymer dispersion. Frequently, the polymer solids contents of the aqueous polymer dispersions are from 30 to 80% by weight, from 40 to 70% by weight or from 45 to 65% by weight. The polymer powders prepared from the polymer dispersions and aqueous dispersions which are obtainable by redispersing the polymer powders in water are likewise preferred. Both aqueous polymer dispersions and the powders prepared therefrom are moreover commercially available, for example under the brands ACRONAL®, STYRONAL®, BUTOFAN®, STYROFAN® and KOLLICOAT® from BASF Aktiengesellschaft, Ludwigshafen, Germany, VINNOFIL® and VINNAPAS® from Wacker Chemie-GmbH, Burghausen, and RHODIMAX® from Rhodia S.A.

Suitable surface-active substances for the emulsion polymerization are the emulsifiers and protective colloids usually used for the emulsion polymerization. Preferred emulsifiers are anionic and nonionic emulsifiers which, in contrast to protective colloids, have as a rule a molecular weight below 2000 g/mol and are used in amounts of up to 0.2 to 10% by weight, preferably from 0.5 to 5% by weight, based on the polymer in the dispersion or on the monomers M to be polymerized.

Such protective colloids have already been mentioned above by way of example for the microcapsule formation.

The anionic emulsifiers include alkali metal and ammonium salts of alkylsulfates (alkyl Radical: $C_8$-$C_{20}$), of sulfuric monoesters of ethoxylated alkanols (degree of ethoxylation: from 2 to 50, alkyl radical: $C_8$ to $C_{20}$) and of ethoxylated alkylphenols (degree of ethoxylation: from 3 to 50, alkyl radical: $C_4$-$C_{20}$), of alkanesulfonic acids (alkyl radical: $C_8$ to $C_{20}$), of sulfonated mono- and di-$C_6$-$C_{18}$-alkyldiphenyl ethers, as described in U.S. Pat. No. 4,269,749, and of alkylarylsulfonic acids (alkyl radical: $C_4$-$C_{20}$). Further suitable anionic emulsifiers are described in Houben-Weyl, Methoden der organischen Chemie, Volume XIV/1, Makromolekulare Stoffe, Georg-Thieme-Verlag Stuttgart, 1961, pages 192-208.

Suitable nonionic emulsifiers are araliphatic or aliphatic nonionic emulsifiers, for example ethoxylated mono-, di- and trialkylphenols (degree of ethoxylation: from 3 to 50, alkyl radical: $C_4$-$C_9$), ethoxylates of long-chain alcohols (degree of ethoxylation: from 3 to 50, alkyl radical: $C_8$-$C_{36}$), and polyethylene oxide/polypropylene oxide block copolymers. Ethoxylates of long-chain alkanols (alkyl radical: $C_{10}$-$C_{22}$, average degree of ethoxylation: from 3 to 50) are preferred, and particularly preferred among these are those based on axe alcohols and natural alcohols having a linear or branched $C_{12}$-$C_{18}$-alkyl radical and a degree of ethoxylation of from 8 to 50.

Of course, the molecular weight of the polymers can be adjusted by adding regulators in a small amount, as a rule up to 2% by weight, based on the polymerizing monomers M. Particularly suitable regulators are organic thio compounds, and furthermore allyl alcohols and aldehydes. In the preparation of the butadiene-comprising polymers of class I, regulators are frequently used in an amount of from 0.1 to 2% by weight, preferably organic thio con pounds, such as tert-dodecyl mercaptan.

After the end of the polymerization, the polymer dispersions used are frequently rendered alkaline, preferably adjusted to a pH in the range from 7 to 10, before their used according to the invention. Ammonia or organic amines can be used for the neutralization, and preferably hydroxides, such as sodium hydroxide, potassium hydroxide or calcium hydroxide, can be used.

For the preparation of polymer powders, the aqueous polymer dispersions are subjected in a known manner to a drying process, preferably in the presence of conventional drying assistants. A preferred drying process is spray drying. If required, the drying assistant is used in an amount of from 1 to 30% by weight, preferably from 2 to 20% by weight, based on the polymer content of the dispersion to be dried.

The spray drying of the polymer dispersions to be dried is effected as a rule as already described for the microcapsule dispersion, often in the presence of a conventional drying assistant, such as homo- and copolymers of vinylpyrrolidone, homo- and copolymers of acrylic acid and/or of methacrylic acid with monomers carrying hydroxyl groups, vinylaromatic monomers, olefins and/or (meth)acrylic esters, polyvinyl alcohol and in particular arylsulfonic acid/formaldehyde condensates and mixtures thereof.

Furthermore, a conventional anticaking agent, such as a finely divided inorganic oxide, for example a finely divided silica or a finely divided silicate, e.g. talc, may be added during the drying process to the polymer dispersion to be dried.

For certain uses of the coarse-particled preparations according to the invention, water stability of the binder polymers is not necessary, for example in closed nonaqueous systems. In such cases, binder polymers which are water-soluble or partly water-soluble are also suitable.

Natural polymeric binders, such as starch and cellulose, and synthetic polymeric binders are suitable. Such binders are, for example, polyvinylpyrrolidone, polyvinyl alcohol or partially hydrolyzed polyvinyl acetate having a degree of hydrolysis of at least 60%, and copolymers of vinyl acetate and vinylpyrrolidone, and furthermore graft polymers of polyvinyl acetate with polyethers, in particular ethylene oxide. Graft polymers of polyvinyl acetate with ethylene oxide have proven to be particularly advantageous. Such graft polymers are described, for example, in EP-A-1 124 541, the teaching of which is hereby incorporated by reference.

Such polymers are moreover commercially available, for example under the brands KOLLIDON® and KOLLICOAT® of BASF Aktiengesellschaft.

The production of the coarse-particled preparation can be effected by bringing the microcapsules together with the polymeric binder and water into a coarse-particled form, for example by granulation or extrusion, and then, it appropriate, drying them. The binder can be added to the microcapsule powder. According to a further embodiment, the binder can be added as a spray assistant during the spray drying of the microcapsules. Such preferred binders are those mentioned above for the spray drying of the microcapsules. They are usually added in an amount of from 1 to 10% by weight, based on the solids content of the microcapsule dispersion. In these cases, the addition of further binder is possible but as a rule not necessary.

The organic protective colloids used in the production of the microcapsules can also act as binders. The addition of further binders is as a rule then not necessary. According to this preferred variant, an oil-in-water emulsion is prepared from 10 to 100% by weight of one or more $C_1$-$C_{24}$-alkyl esters of acrylic and/or methacrylic acid (monomers I), from 0 to 80% by weight of a bifunctional or polyfunctional monomer (monomers II) which is not soluble or is sparingly soluble in water and from 0 to 90% by weight of other monomers (monomer III), based in each case on the total weight of the monomers, the latent heat accumulator material and the organic protective colloid, and the capsule wall is formed by free radical polymerization and the resulting microcapsule dispersion is spray-dried and is brought into a coarse-particled form.

The production of the preparation can be effected by methods known for agglomerates, such as pellets, tablets and granules.

According to the invention, granules can be prepared by mixer granulation. Mixers which are provided with rigid or rotating inserts (e.g. Diosna pharmaceutical mixers) and ideally mix, granulate and dry in one operation are used. Granules are built up in the microcapsule powder with addition of polymeric binder and, if appropriate, water by the agitation with rearrangement. Said granules are then dried in a fluidized-bed, through-circulation or vacuum drier and are comminuted by means of screens or mills. For example, a vacuum rotary mixer-drier is particularly gentle and dust-free.

According to the invention, the microcapsules are extruded together with the polymeric binder.

The production of the coarse-particled preparation is effected with addition of water and the polymeric binder. It is possible to meter the water into the microcapsule powder and/or binder powder. According to a preferred embodiment, the microcapsule powder is mixed directly with a binder dispersion of the desired water content. The water content is 10-40% by weight, based on the total mixture. A lower water content leads as a rule to incomplete mixing of the two components and poor shapeability. Higher water contents are possible in principle; above 50% by weight of water, the material can no longer be extruded but dissolves. A water content of 20-35% by weight at the discharge point is preferred since, in this range, the pellets obtained already have good strength.

Extruders such as single-screw or twin-screw extruders and so-called melt calendering or melt pelletizing are suitable. Twin-screw extruders operate according to the principle of a mixing unit which simultaneously transports forward to a die and compacts.

According to a preferred embodiment, the product in the feed zone is compacted toward the heat-up zone. In the middle zone of the extruder, the substances are dispersed and, if appropriate, devolatilized. In the end zone of the extruder, the mixture is discharged under pressure through a die.

Extrusion is effected in the region of the glass transition temperature of the binder polymer and preferably below the softening or decomposition temperature of the microcapsule wall. The binder polymer should form a film under the processing conditions, i.e. it should at least partly melt or soften, but without acquiring too low a viscosity, in order to shape the microcapsule preparation. A suitable temperature range is the range from 25 K below to about 50 K above the glass transition temperature. The softening range of the binder polymer can, however, occasionally be substantially reduced by plasticizer or solvent effects so that, in the presence of these substances, processing up to 50 K below the glass transition temperature is also possible. With the use of volatile plasticizers, it is therefore possible to remove these after the shaping process, with the result that greater strength is achieved. Since water is a plasticizer for polar polymers and the water-soluble, film-forming polymers, consideration of the glass transition temperature of the pure polymer is not applicable in these cases.

If desired, the die of the extruder may consist of one or more orifice nozzles or a sheet die or may have a more complicated shape, for example may be tubular. According to the invention, dies which give particles whose ratio of surface area to volume obeys the following relationship are chosen:

$$\frac{\sqrt[2]{\text{Surface area}}}{\sqrt[3]{\text{Volume}}} \geq 2.5.$$

Preferred dies have, for example, a cross or star shape, for example 3-, 4-, 5- or 6-pointed.

According to a preferred variant, the temperatures in the extruder are from 40 to 120° C. This makes it possible for a constant temperature to prevail. It is also possible for a temperature gradient from 40 to 120° C. to prevail along the transport direction of the microcapsule/binder mixture. In the case of the gradient, any gradations from continuous to stepwise are possible. The agglomeration at these temperatures has the advantage that a part of the water evaporates during the mixing and/or compaction process itself.

If appropriate, lubricants, such as stearic acid, are added for the extrusion.

Other additives of the coarse-particled microcapsule preparation may be: dyes, pigments, fragrances, antistatic agents, water repellents and preferably graphite, in particular expanded graphite.

According to a preferred embodiment, the preparation comprises 2-20% by weight of graphite, based on the total weight of the coarse-particled preparation.

The preparation of expanded graphite and products comprising expanded graphite is disclosed in U.S. Pat. No. 3,404,061. For the preparation of expanded graphite, graphite intercalation compounds or graphite salts, e.g. graphite hydrogen sulfate or graphite nitrate, are subjected to a shock heat treatment. The resulting so-called expanded graphite product consists of worm- or concertina-shaped aggregates.

By compaction of this expanded graphite product under pressure, it is possible to produce self-supporting graphite films or sheets without addition of binder. If such compacted or "precompacted" expanded graphite product is comminuted with the aid of cutting, impact and/or jet mills, a powder or shreds comprising precompacted expanded graphite product is or are then obtained, depending on the degree of comminution. These powders can be finely divided and homogeneously mixed into molding materials. Alternatively, expanded graphite product can also be comminuted directly, i.e. without prior compaction, to give a powder which can be mixed into molding materials.

Powders or shreds comprising compacted expanded graphite product can be re-expanded if this is required for further use. Such a process is described in U.S. Pat. No. 5,882,570. In this way, a so-called re-expanded graphite powder (re-expanded product) is obtained.

Below, the term "expanded graphite" is used as an overall term for (i) expanded graphite product, (ii) powders or shreds obtained by comminution of compacted expanded graphite product, (iii) powder obtained by comminution of expanded graphite product and (iv) re-expanded product produced by re-expansion of comminuted compacted expanded graphite product. All forms (i) to (iv) of the expanded graphite are suitable additives of the coarse-particled microcapsule preparation. The expanded graphite product has a bulk density of from 2 to 20 g/l, the comminuted expanded graphite product has a bulk density of from 20 to 150 g/l, the comminuted compacted expanded graphite product has a bulk density of from 60 to 200 g/l and the re-expanded compacted expanded graphite product has a bulk density of from 20 to 150 g/l.

In the case of expanded graphite having a mean particle size of about 5 μm, the specific surface area according to the BET method is typically from 25 to 40 m$^2$/g. With increasing diameter of the particles, the BET surface area of the expanded graphite increases but still remains at a relatively high level. Thus, expanded graphite having a mean particle size of 5 mm still has a BET surface area of more than 10 m$^2$/g. For the production of particles according to the invention, the expanded graphite having mean particle sizes in the range from 5 μm to 5 mm are suitable. Expanded graphite having a mean particle size in the range from 5 μm to 5 mm is preferred, particularly preferably in the range from 50 μm to 1 mm.

The microcapsule preparations according to the invention have the latent heat accumulator material tightly enclosed so that no emissions in the surrounding air are detectable. This permits their use not only in closed systems but moreover in open systems.

The coarse-particled microcapsule preparations are outstandingly suitable for use in building materials and as storage material in heat exchangers. They exhibit good hardness and are abrasion-resistant. Their coarse-particled structure permits freely selectable accumulator geometry, for example beds for floor coverings, chemical reactors or columns, and in applications involving through-flow, such as heat exchangers, in solar units, heating systems, in particular warm air heating systems, and central and localized ventilation.

Owing to the advantageous ratios of surface area to cavities of the particles, a high degree of heat transfer is possible, which can be rapidly removed as a result of the good flow-through properties of an arbitrary carrier material, such as air or water. Based on the volume of the preparation, the coarse-particled microcapsules have a very high storage capacity and therefore have a very high efficiency. With the same storage capacity in comparison with conventional heat accumulators, they therefore have a low space requirement as well as a lower accumulator weight.

The coarse-particled microcapsule preparations according to the invention can moreover advantageously be processed together with mineral or silicate binding building materials. Suitable mineral binders are generally known. They are finely divided inorganic substances, such as lime, gypsum, clay, loam and cement, which are converted into their ready-to-use form by stirring with water and, on drying, solidify as a function of time, if appropriate at elevated temperature. The coarse-particled microcapsule preparations according to the invention are converted into the ready-to-use moldings together with the mineral binder, water, additives, such as gravel, sand, glass or mineral fibers, and, if appropriate, assistants.

The flowing examples are intended to explain the invention in more detail.

A microcapsule powder as obtained according to example 1 of DE 101 63 162 and with subsequent spray drying was used. The microcapsules had a mean diameter of 7.8 μm.

EXAMPLE (NON-INVENTIVE)

287 g of a 55% strength by weight aqueous styrene/acrylonitrile dispersion (cf. material B in example 5) and 623 g of water were slowly added to 3000 g of the microcapsule powder described above (melting point 28° C.) in a Diosna type V 50 mixer. The moistened material was thoroughly mixed for 6 min with participation of the shredder (stage 1) so that the amount of liquid was present in a uniform distribution. This material was then extruded in an Alexanderwerk type RSA laboratory granulator having a vertical screen of mesh size 3.0 mm. The granules were then dried on trays. Dry extrudates having a diameter of about 3 mm and a length of 4 mm which were hard and stable to abrasion were obtained.

Comparative Example

Machine: Closely intermeshing corotating tin-screw extruder of type FTS 16 mm, orifice nozzle of 3 mm diameter as a die, 5 heating zones from the feed orifice to the die, zones 1 to 4 heated to 75° C., zone 5 heated to 85° C. Apart from one element (back-conveying element) approximately in the middle, the extruder screw used consists of conventional conveying elements which ensure mixing in through a strong shear field in the V region. The total throughput is 775 g/h and the screw speed is 150 rpm. The pressure buildup in the screw ensures continuous discharge of the wet latent heat accumulator powder.

Materials:
A) pray-dried PMMA microcapsule powder according to DE 197 49 731 comprising a core of n-octadecane, consisting of 87% by weight of core, 10% by weight of crosslinked PMMA wall (PMMA—polymethyl methacrylate) and 3% of polyvinyl alcohol dispersant.
B) 55% strength by weight aqueous polymer dispersion of a polymer of 88% by weight of styrene, 10% by weight of acrylonitrile and 2% by weight of acrylic acid, number average molecular weight $M_n$: 8000, volume average molecular weight $M_w$: 45 000, glass transition temperature Tg: 105° C.

92 g of the dispersion B), 183 g of water and 500 g of microcapsule powder A) were mixed in a vessel and introduced into the feed hopper of the extruder. This amount of material is completely drawn in an processed in the course of one hour. The head temperature of the extruder reaches 91° C. after a few minutes. At this temperature, the material is homogeneously and uniformly conveyed out of the die and is obtained in the form of about 3 mm wide and 5 mm long granules by water-free dry face cutting. The theoretical binder content of the granules is 9.2% by weight; the paraffin content of the end product is 79%. The granules were then dried in a warm air stream. The granules can be broken with the fingers by applying a certain amount of force but are stable when the granules are shaken. Even after storage under water for several days, the granules are stable without any signs of dissolution.

The pore area, measured by mercury porosimetry according to DIN 66133, is 28.1 m²/g.

Example 1

Figure 1:
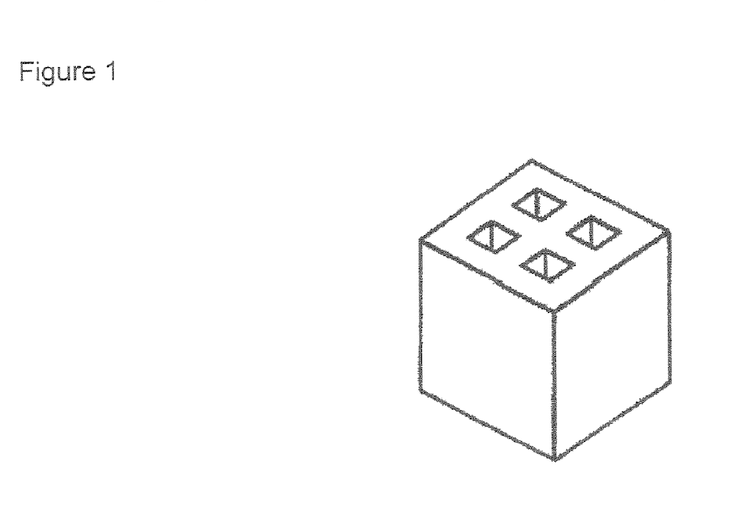
Figure 2:
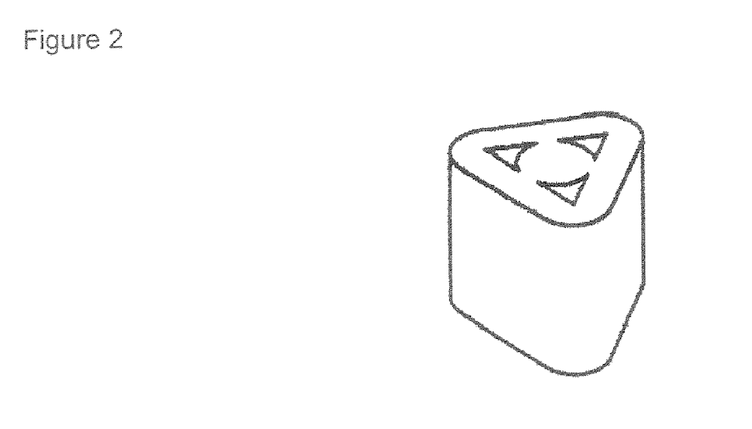
Figure 3:
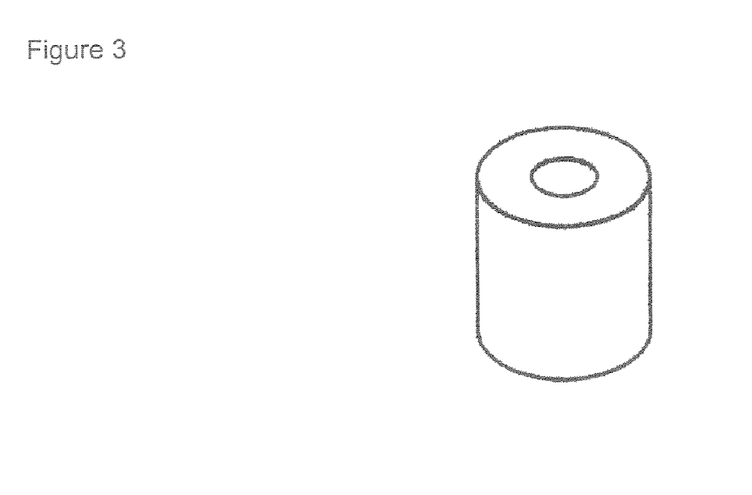
Figure 4:
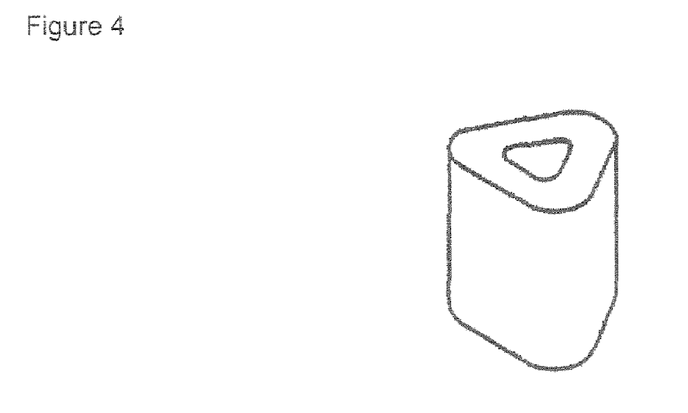
Figure 5:
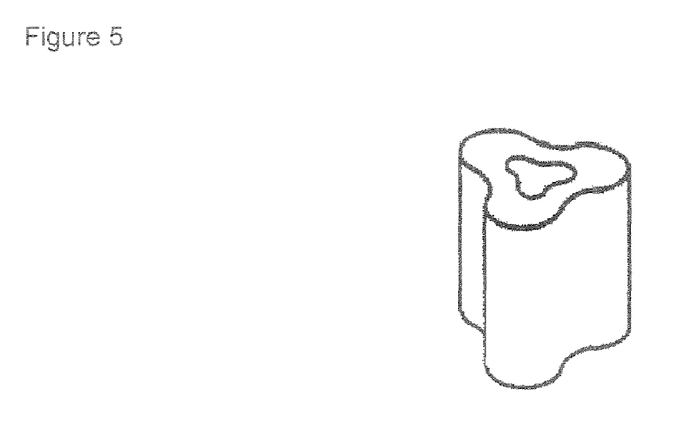
Figure 6:
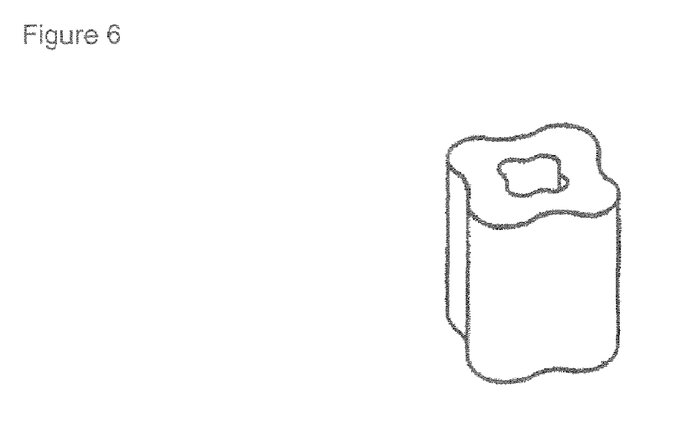
Figure 7A:
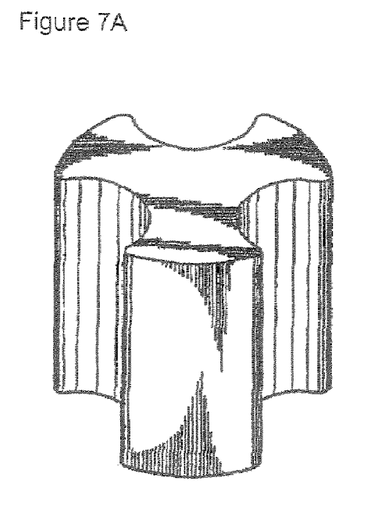
Figure 7B:
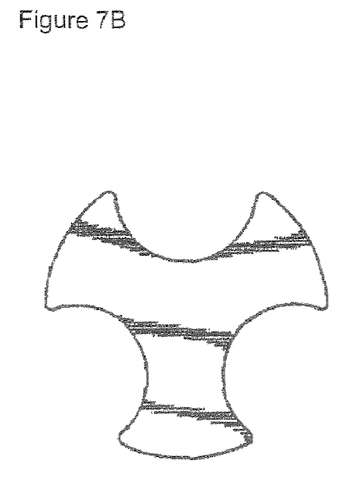
Figure 8A:
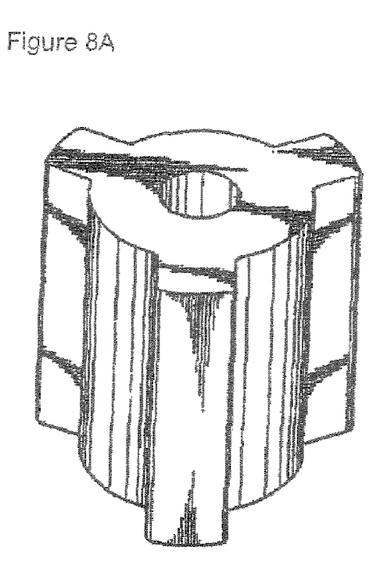
Figure 8B:
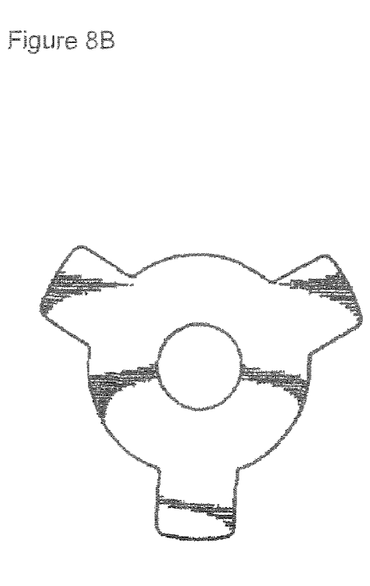
Figure 9A:
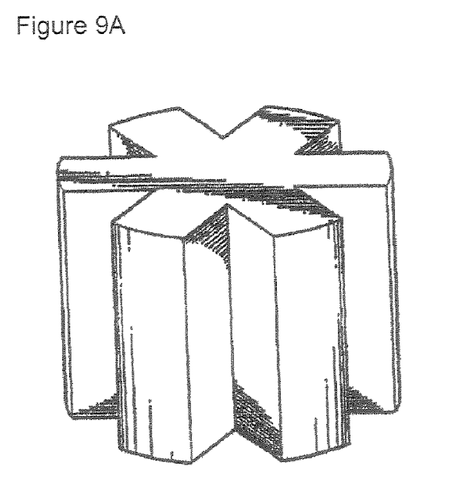
Figure 9B:
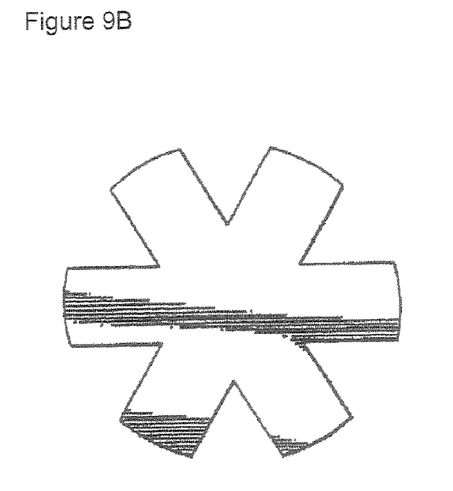
Figure 10A:
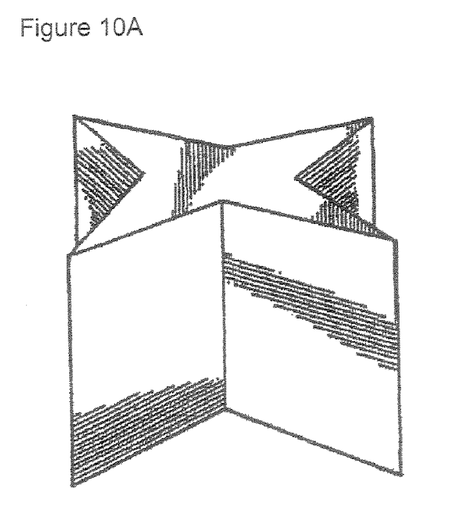
Figure 10B:
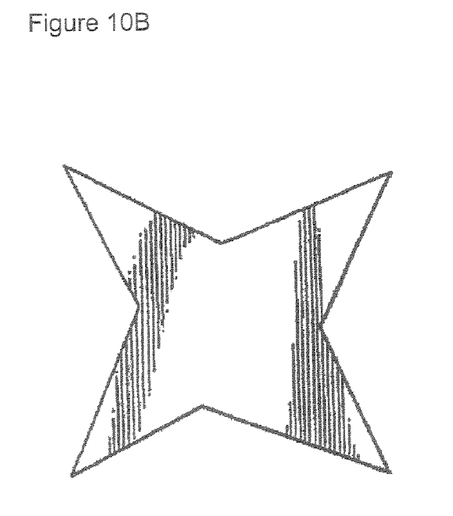

The experimental extrudate setup of the comparative example was adopted, except that a die having a star shape (analogous to FIG. 10 B) was used (4×3 mm profiled die).

Materials:
A) Spray-dried PMMA microcapsule powder comprising a core of n-octadecane
B) 55% strength by weight aqueous polymer dispersion of a polymer of 88% by weight of styrene, 10% by weight of acrylonitrile and 2% by weight of acrylic acid, number average molecular weight $M_n$: 8000, volume average molecular weight $M_W$: 45 000, glass transition temperature Tg: 105° C.

900 g/h of the dispersion B), 300 g/h of water and 6500 g of microcapsule powder A) were mixed in a vessel and introduced into the feed hopper of the extruder. This amount of material was completely drawn in and processed in the course of one hour. The head temperature of the extruder reached 55° C. after a few minutes. At this temperature, the material was homogeneously and uniformly conveyed out of the die, and granules having a length of 4 mm and a total diameter of 3 mm were obtained by water-free dry face cutting. The edges of the granules are rounded. The theoretical binder content of the granules is 4.4% by weight. The granules were then dried in a warm air stream.

The pore area, measured by mercury porosimetry according to DIN 66133, is 39.6 m²/g.

We claim:

1. A coarse-particled microcapsule preparation comprising one or more microencapsulated latent heat accumulator materials and one or more polymeric binders, the ratio of surface area to volume of the particles obeying the following relationship:

$$\frac{\sqrt[2]{\text{Surface area}}}{\sqrt[3]{\text{Volume}}} \geq 2.5.$$

2. The coarse-particled microcapsule preparation according to claim 1, 90% by weight of the particles being greater than 500 μm.

3. The coarse-particled microcapsule preparation according to claim 1, the binder content, calculated as solid, being 1-40% by weight, based on the total weight of the coarse-particled microcapsule preparation.

4. The coarse-particled microcapsule preparation according to claim 1, the latent heat accumulator material being a lipophilic substance having a solid/liquid phase transition in the temperature range from −20 to 120° C.

5. The coarse-particled microcapsule preparation according to claim 1, the latent heat accumulator material being an aliphatic hydrocarbon compound.

6. The coarse-particled microcapsule preparation according to claim 1, the capsule wall being a thermosetting polymer.

7. The coarse-particled microcapsule preparation according to claim 1, the capsule wall being composed of
from 10 to 100% by weight of one or more $C_1$-$C_{24}$-alkyl esters of acrylic and/or methacrylic acid (monomers I)
from 0 to 80% by weight of a bifunctional or polyfunctional monomer (monomers II) which is insoluble or sparingly soluble in water and
from 0 to 90% by weight of other monomers (monomers III),
based in each case on the total weight of the monomers.

8. The coarse-particled microcapsule preparation according to claim 1, the binder polymer having film-forming properties under processing conditions.

9. The coarse-particled microcapsule preparation according to claim 1, the binder polymer having a glass transition temperature of from −60 to +150° C.

10. The coarse-particled microcapsule preparation according to claim 1, the binder polymer being synthesized from one or more ethylenically unsaturated monomers M by emulsion polymerization.

11. The coarse-particled microcapsule preparation according to claim 1, the binder polymer being a homopolymer of vinyl esters of aliphatic carboxylic acids or a copolymer of vinyl esters of aliphatic carboxylic acids with olefins and/or alkyl (meth)acrylates.

12. The coarse-particled microcapsule preparation according to claim 1, the binder polymer being a copolymer of styrene with acrylonitrile.

13. The coarse-particled microcapsule preparation according to claim 1, the coarse-particled preparation comprising 2-20% by weight, based on the total weight of the preparation, of graphite.

14. The coarse-particled microcapsule preparation according to claim 13, the graphite being expanded graphite.

15. A process for the production of coarse-particled microcapsule preparations according to claim 1, wherein the microcapsules are brought, together with the polymeric binder and water, into a coarse-particled form and, if appropriate, then dried.

16. The process for the production of coarse-particled microcapsule preparations according to claim 15, wherein the microcapsules are extruded together with the polymeric binder dispersion at temperatures in the range from 25 K below to 50 K above the glass transition temperature of the binder polymer and, if appropriate, then dried.

17. The process for the production of coarse-particled microcapsule preparations according to claim 16, wherein extrusion is effected at temperatures in the range from 60 to 110° C.

18. The process for the production of coarse-particled microcapsule preparations according to claim 15, wherein extrusion is effected through a cross or star die.

19. A heat exchanger, comprising the coarse-particled microcapsule preparation according to claim 1.

20. A building material, comprising the coarse-particled microcapsule preparation according to claim 1 and mineral or silicate binding building materials.

* * * * *